United States Patent [19]
Dupont et al.

[11] Patent Number: 5,129,417
[45] Date of Patent: Jul. 14, 1992

[54] VALVE INCLUDING A CLOSING DEVICE AND SEALED CONNECTORS

[75] Inventors: Pierre Dupont, Rambouillet, France; Peter Frafjord, Hafrsfjord, Norway; Bruno Grandgeorge, Vallet, France

[73] Assignees: Den norske stats oljeselskap a.s., Stavanger, Norway; Mobil Oil Corporation, Fairfax, Va.

[21] Appl. No.: 684,943

[22] PCT Filed: Oct. 9, 1989

[86] PCT No.: PCT/NO89/00106
§ 371 Date: May 13, 1991
§ 102(e) Date: May 13, 1991

[87] PCT Pub. No.: WO90/04126
PCT Pub. Date: Apr. 19, 1990

[30] Foreign Application Priority Data
Oct. 14, 1988 [NO] Norway .................................. 884588

[51] Int. Cl.⁵ .............................................. F16K 43/00
[52] U.S. Cl. .................. 137/315; 137/454.6; 251/315; 251/316
[58] Field of Search .................. 137/315, 454.2, 454.5, 137/454.6; 251/309, 315

[56] References Cited
U.S. PATENT DOCUMENTS

| | | | |
|---|---|---|---|
| 3,656,501 | 4/1972 | Buchta | 137/315 |
| 4,187,872 | 2/1980 | Freeman et al. | 137/454.6 |
| 4,606,368 | 8/1986 | McCafferty | 137/454.2 |
| 4,727,901 | 3/1988 | Horvei | 137/315 |
| 4,901,752 | 2/1990 | Horvei | 137/315 |
| 4,917,141 | 4/1990 | Brunel et al. | 137/315 |
| 4,961,444 | 10/1990 | Morgan et al. | 137/315 |

FOREIGN PATENT DOCUMENTS
0132989 2/1985 European Pat. Off.
WO84/00791 3/1984 PCT Int'l Appl.
306824 12/1968 Sweden.

Primary Examiner—George L. Walton
Attorney, Agent, or Firm—Foley & Lardner

[57] ABSTRACT

This invention relates to a valve comprising a valve body and a dismountable closing means. The closing means comprises a closing member and a support which carries the closing member is received in an inner cavity in the valve body. Locking of the closing means in the inner cavity is ensured by means of circular grooves formed in a side wall of the cavity, and movable locking pieces carried by the support and cooperating with an exterior ring via can elements. Axial movement of the ring results in a radial displacement of the locking pieces and thereby permitting insertion and removal of said closing means into and out of said valve body.

9 Claims, 6 Drawing Sheets

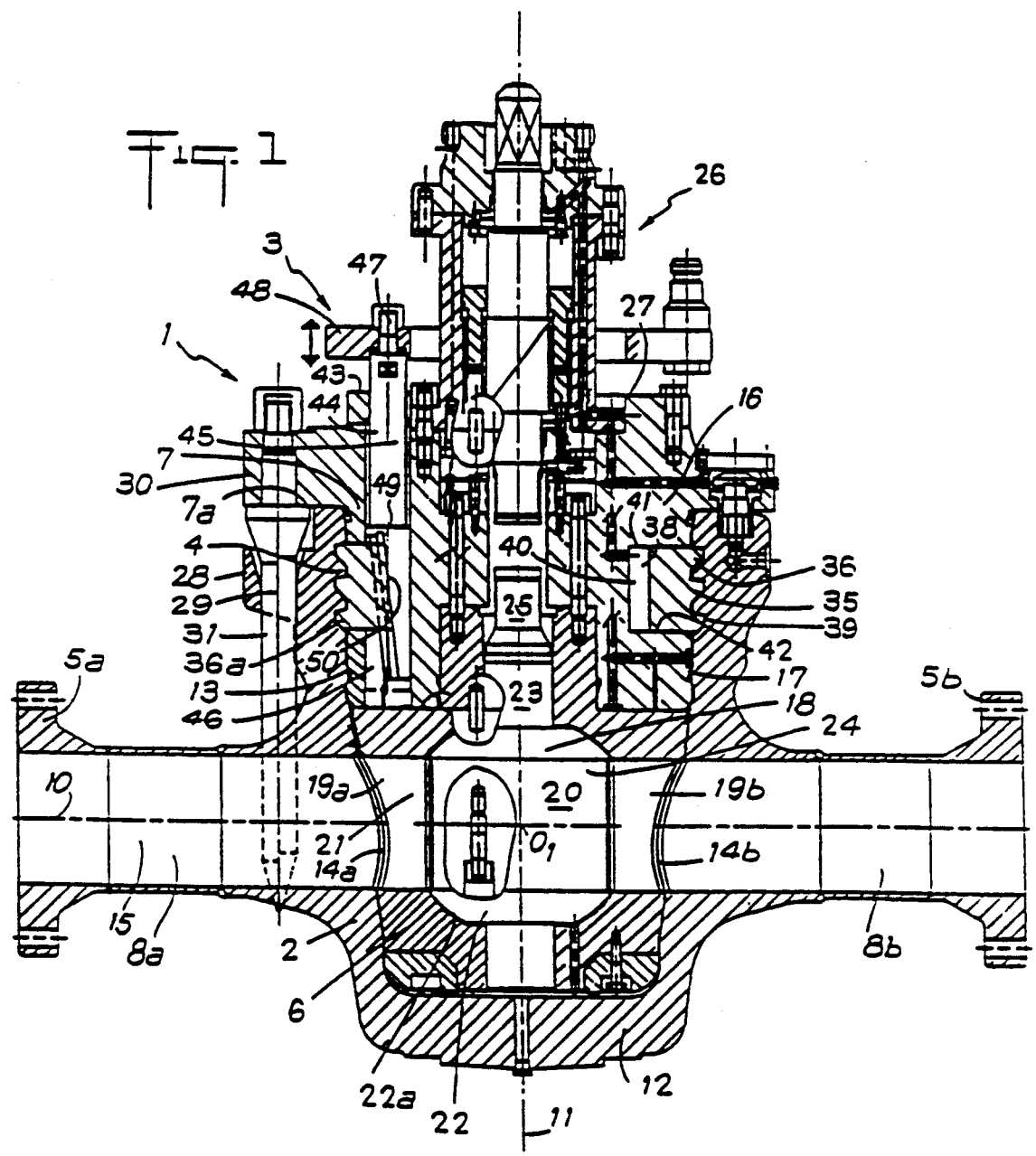

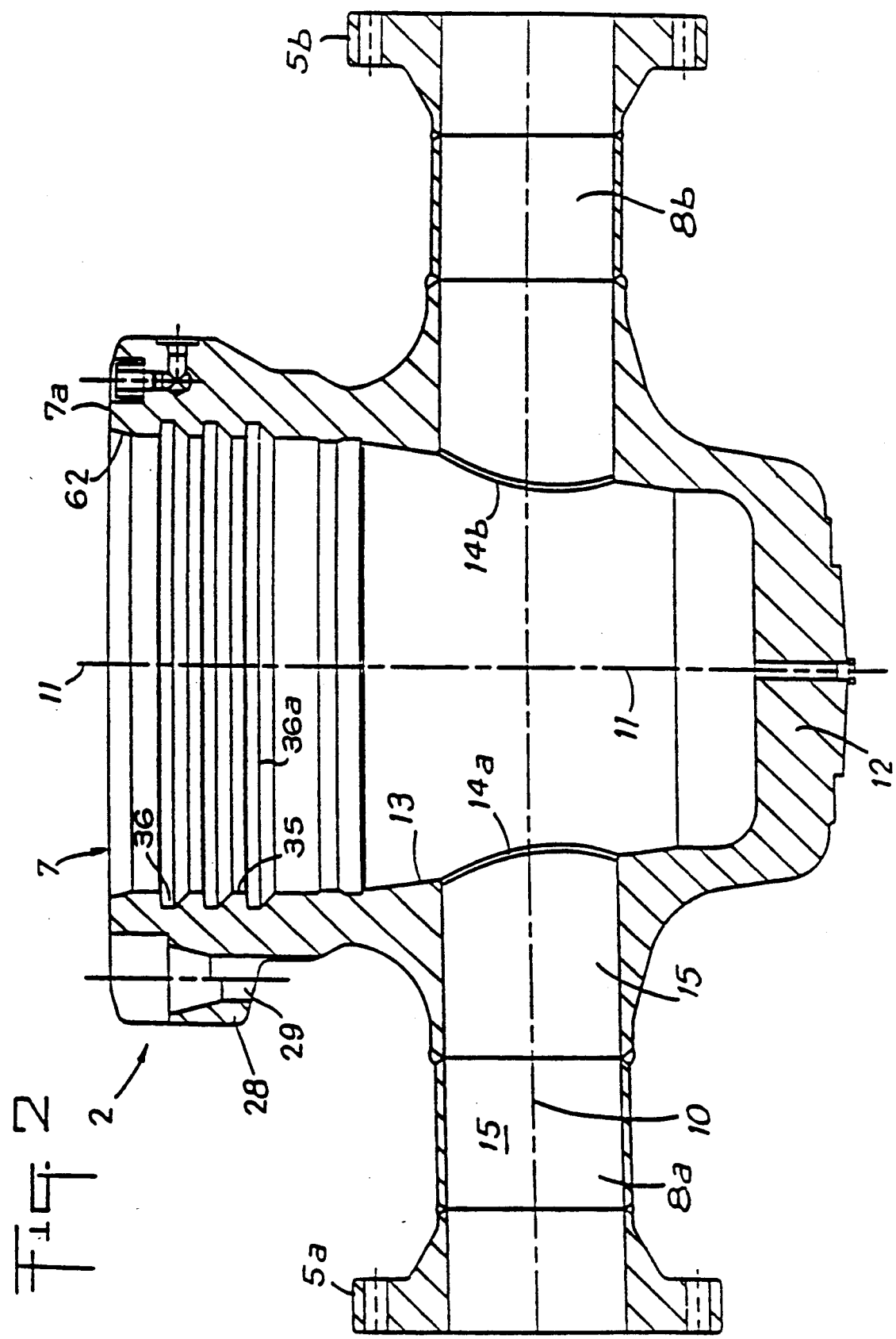

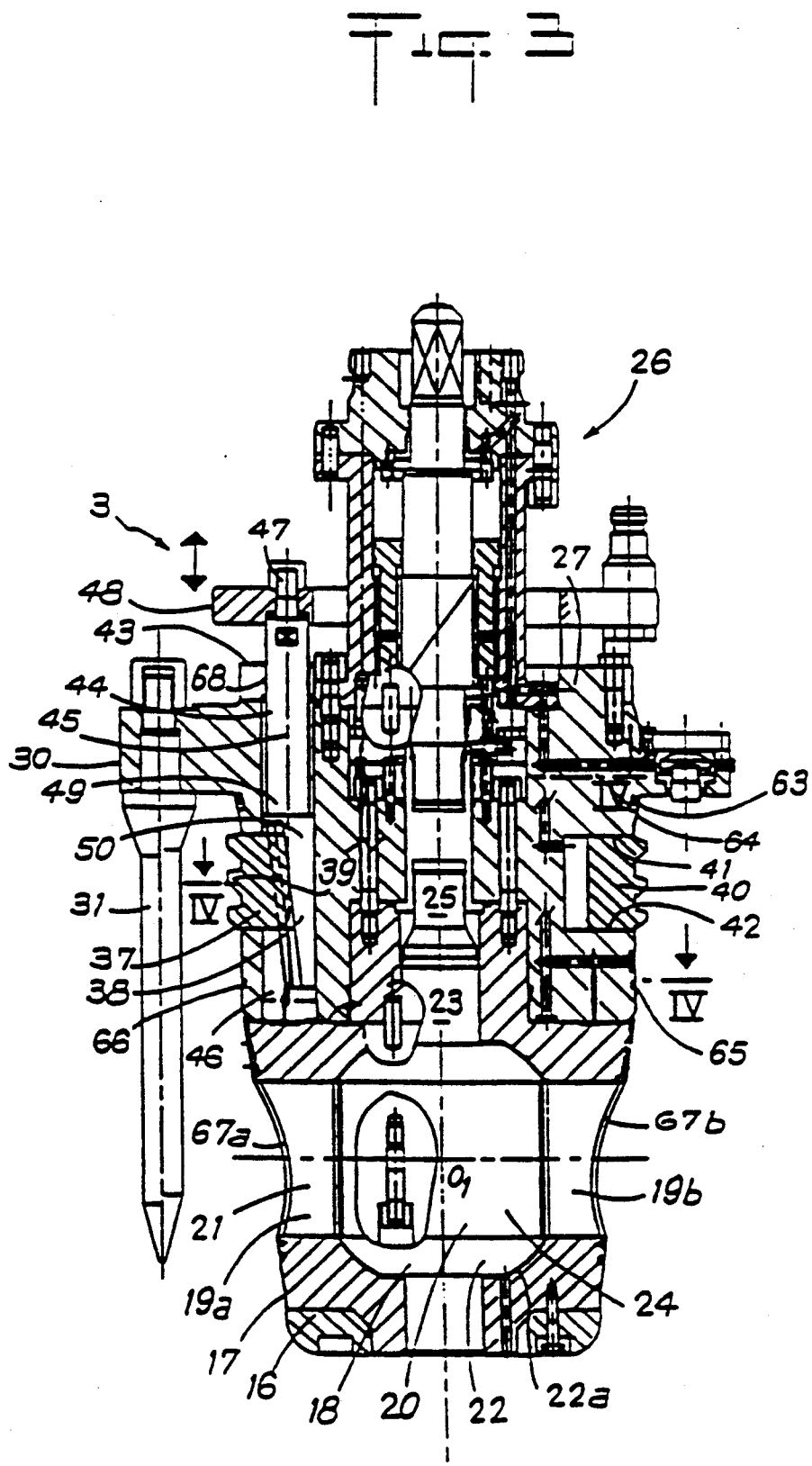

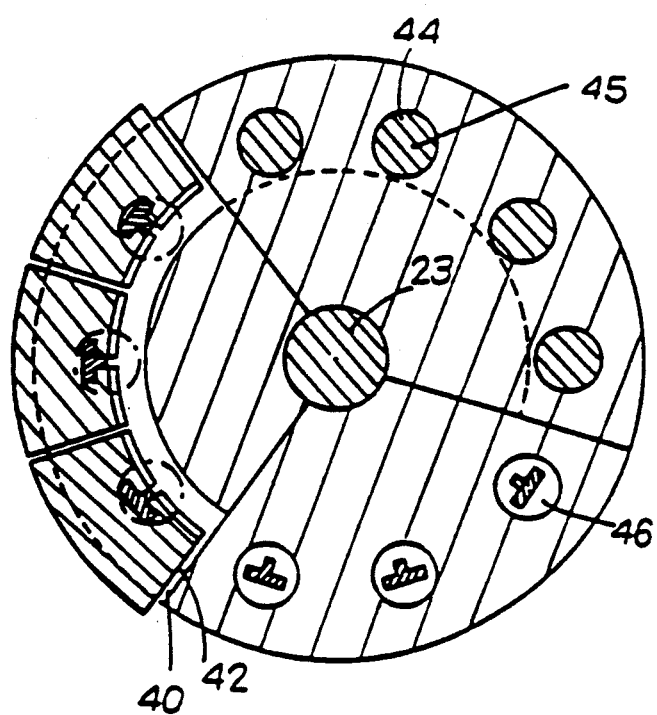
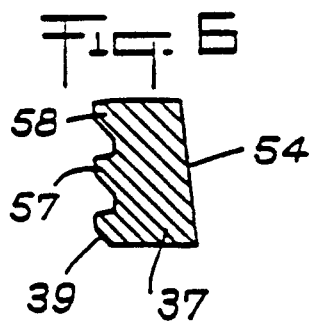
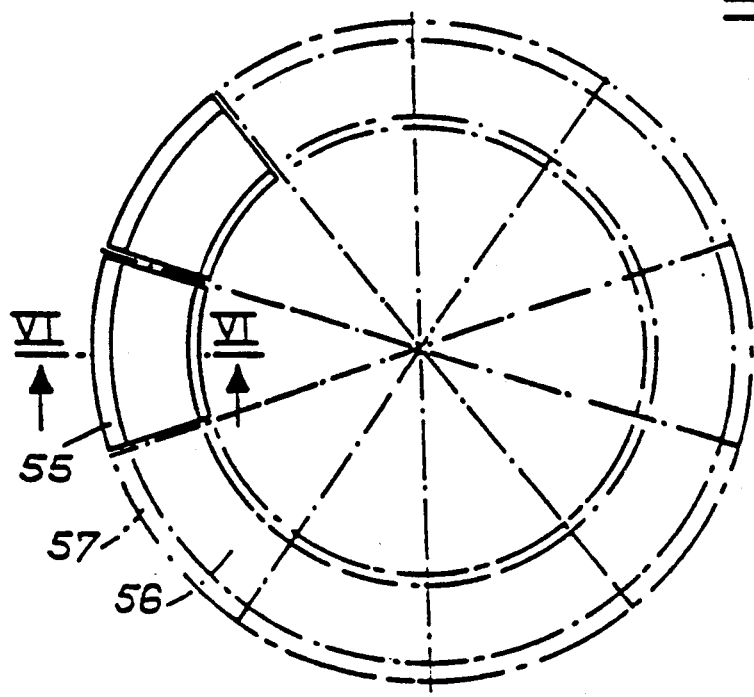

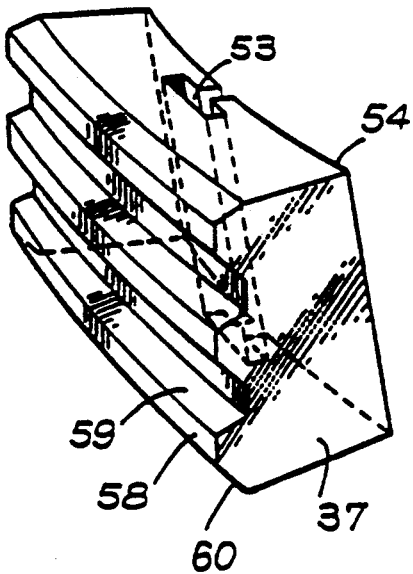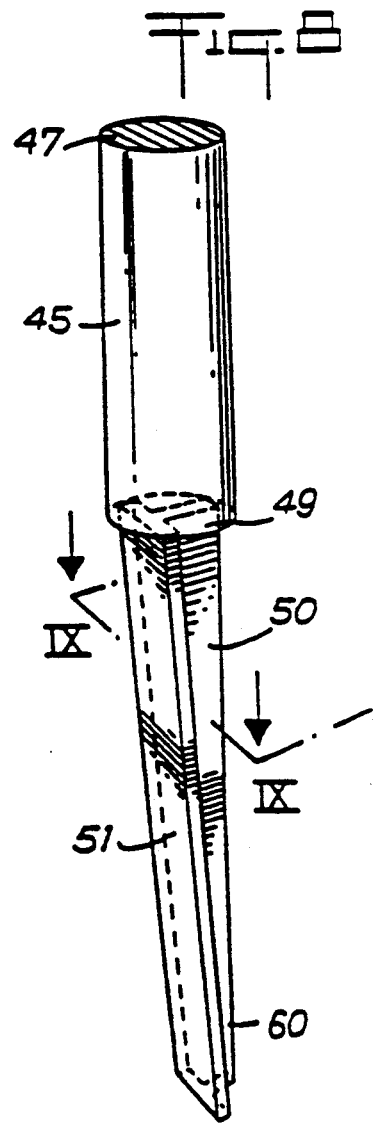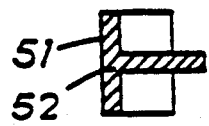

VALVE INCLUDING A CLOSING DEVICE AND SEALED CONNECTORS

BACKGROUND OF THE INVENTION

The present invention relates to a valve comprising a valve body which forms a fluid channel or passage and an inner cavity having a geometrical axis being substantially normal to the axis of the fluid channel and provided with an opening located in a plane lying substantially normal to the geometrical axis, and further comprising closing means having a movable closing member and a support which accommodates the closing member and delimits a channel which is aligned with the fluid channel, the closing means being accommodated in the inner cavity by being inserted through said opening, and the support is mounted in the valve body with a connector means.

This type of valve is intended for use in an installation for gas or oil production, in particular in an underwater installation.

The closing means may be dismounted and the closing member also has a channel which can be displaced either by translation or by rotation between an "open" position in which the channel is aligned with said fluid channel in the support, and a "closed" position in which the channel in the closing member is not in correspondence with the fluid channel of the support.

European patent application 0132989 describes such a valve in which the connector device comprises a locking collar provided outside the valve body and comprises two halves which are pivotable about a fixed axis on the valve body. There is provided a circular groove in the inner surface of the collar. This groove is adapted to cooperate with a flange on the valve body and a support member so that the closing means is united with the valve body. At the opposite side in relation to the pivot axis the two collar halves are adapted to be connected to each other by means of attachement elements.

This connecting or locking system has several drawbacks. In the first place the movable parts of the connector device are carried by the valve body which is installed in a pipeline system in a non-dismountable manner, which is in turn located on the seabed. This means that a reduced function of the collar as a result of shocks occurring during mounting or retrieving of the movable closing means, may involve great difficulties in repairs and will necessitate long interruptions of the production at the installation. Besides, the movable elements which are located outside the valve, will be subject to the marine environment, which is highly corrosive. The pivot axis as well as the attachement elements are attacked by the seawater, possibly leading to functional problems. Finally, the connection and disconnection of the arrangement, which usually take place by means of a robot, necessarily involves several operations, namely on the attachement elements and swinging of both collar halves by rotation about the pivot axis.

OBJECTS AND SUMMARY OF THE INVENTION

The object of this invention is to provide a valve which avoids the drawbacks discussed above, in which the connector device is protected against the ambient environment, in which the valve body does not carry any movable connector element and for that reason does not require any particular maintenance, in which connection and disconnection take place by a simple translatory movement, and in which maintenance of the movable connector elements and verification of their correct function can be performed at the surface during periodic inspections of the closing means.

According to the invention this object attained whereby in the valve of the type stated above, the connector device comprises fixed elements provided in the interior of the inner cavity and movable elements provided at the support, and the connector device is protected in a sealed manner in relation to the ambient environment and to the fluid.

The fixed element comprises at least a rest which is formed in the valve body and which opens towards the cavity, and the movable elements comprise at least one locking piece mounted in the support and being radially movable in relation to said geometric axis under the influence of an actuating member, and can assume two extreme positions:

one position remote from the geometric axis, in which the locking piece extends partially into at least one of the rests so that the connection is secured, and a position closer to the geometrical axis, in which the locking piece is located in the support so that insertion of the closing means in the inner cavity is possible.

As a result of this solution, the valve body has no movable connector element and the movable connector elements are integral with the movable closing means, which makes maintenance and inspection of these movable elements possible at the surface during periodic maintenance of the closing means.

According to a particular feature of the invention, each rest is in the form of a circular groove having the same geometric axis as the inner cavity. The locking pieces are formed by segments of an annulus which has an exterior surface adapted to the shape of the circular grooves. Rests or recesses for the locking pieces can therefore easily be provided and the locking pieces being in the form of annular segments having an outer surface adapted to the shape of the rests, secure a perfect mutual coupling of the valve body and the closing means when the latter is mounted in the inner cavity of the valve body.

According to another particular feature of the invention, the segments are mounted in a circular chamber provided in said support and being open towards the circular grooves. Each segment cooperates with a vertically movable cam element in such a way that an axial movement of the cam element, under the influence of the actuating member, provides for a radial displacement of the segment.

The surface of each segment situated adjacent the geometric axis of said cavity is inclined in relation to the geometric axis. The cam element slides along this surface as the cooperation is effected by means of a T-groove formed in one of the parts, i.e. the cam element or the segment, and by a T profile element received in the T-groove and provided on the other of the parts, i.e. either the segments or the cam element.

Each cam element is attached to the end of a rod which can be displaced in a bore provided in the support and which lies parallel to the geometrical axis. The rods attached at their opposite ends to a common ring located outside the valve, so that an axial movement of the common ring under the influence of the actuating member results in a simultaneous radial displacement of all the segments.

This design makes it possible to connect or disconnect the closing means by a simple translatory movement of a common ring located outside the closing means. A translatory movement of this common ring also enables possible inspection or verification of the movable connector elements from the surface.

According to still another particular feature of the invention, sealing elements or gaskets are carried by the support are provided between this support and the valve body at one and the other side of the connector device.

Other advantages and specific features of the invention will appear from the description of an embodiment given as an example and with reference to the drawings, in which:

BRIEF DESCRIPTION OF THE DRAWINGS

FIG. 1 is a crossection of a valve according to an embodiment of the invention,

FIG. 2 is a crossection of the valve body of the valve of FIG. 1,

FIG. 3 is a crossection of the closing means of the valve of FIG. 1,

FIG. 4 is a crossection along the line IV—IV in FIG. 3,

FIG. 5 is a plan view of an annulus for which there are formed segments which constitute connecting or locking pieces for the valve of FIG. 1, FIG. 6 is a crossection along the line VI—VI in FIG. 5, FIG. 7 is a perspective view of a locking piece of the valve of FIG. 1, FIG. 8 is a perspective view of a rod with a cam element, FIG. 9 is a crossection along the line X—X in FIG. 8.

DETAILED DESCRIPTION OF THE PREFERRED EMBODIMENTS

Figures 10, 11:
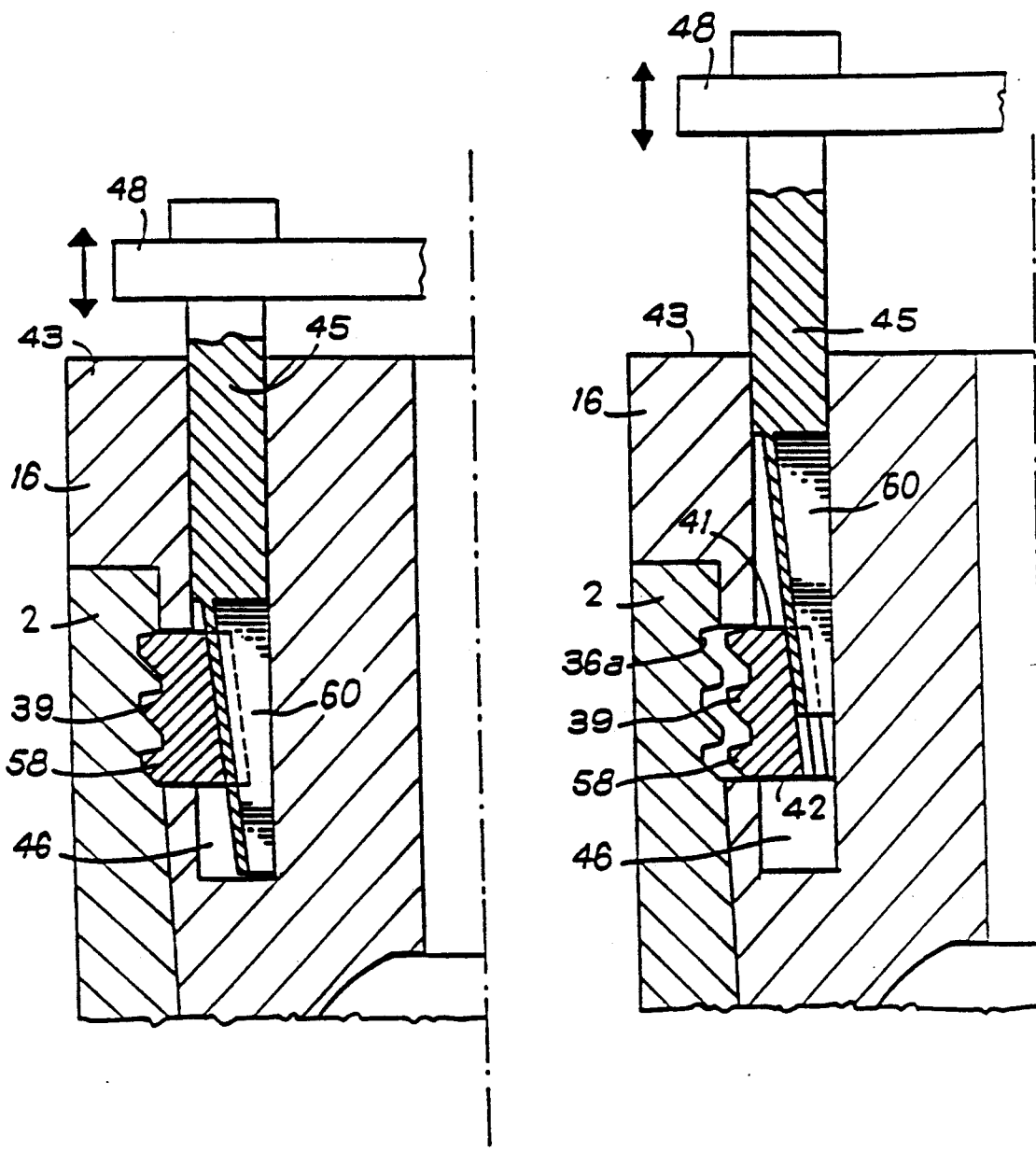
FIG. 10 shows the position of the connector device when a common ring is located in its lower position.
FIG. 11 shows the position of the same connector device when the common ring is located in its upper position.

As seen from the drawings the valve 1 comprises a valve body 2 and a closing means 3 which is united with the valve body 2 by means of a connector device 4.

The valve body 2 is inserted into pipeline parts, not shown, by means of flanges 5a, 5b or any other known methods, for example by welding. The valve body 2 has an inner cavity 6 of generally truncated conical shape widening upwards and having an upper opening 7. The inner cavity 6 communicates with the upstream pipeline through a first channel 8a and with the downstream pipeline through another channel 8b. Channels 8a and 8b are mutually aligned and have a horizontal axis 10 which is substantially normal to the geometric axis 11 of the cavity 6. The cavity 6 is delimited by a bottom 12 opposite to the opening 7 and by a sidewall 13. Channels 8a and 8b are open into this cavity 6 at openings 14a and 14b. The channels 8a and 8b constitute a fluid passage 15 between an upstream pipeline and a downstream pipeline. The opening 7 in the cavity 6 is situated at a plane 7a which is substantially normal to the geometric axis 11.

The closing means 3 is adapted to be inserted into the inner cavity 6 through the opening 7. In order to facilitate the insertion of the closing means 3 into the cavity 6, the geometric axis 11 of the cavity 6 preferably is vertical.

The closing means 3 comprises a support 16 which has an exterior side wall 17 which is generally shaped as a truncated cone and is adapted to generally match the shape of the side wall 13 of the cavity 6, and a closing member 18 is movably mounted in the interior of the support 16. The support 16 is provided with channels 19a, 19b and the closing member 18 has a channel 20 so located that the first channel 8a in the valve body 2 can be put into communication with or blocked from the second channel 8b in the valve body 2.

In the embodiment shown in the drawings the closing member 18 consists of a spherical ball body 22 provided with a horizontal channel 20 and adapted to be rotated about a vertical axle 23 which is connected to the valve ball 22. The support 16 has an interior spherical cavity 24 adapted to match the shape of the ball body 22, a vertical bore 25 in which the axle 23 can be rotated, and horizontal channels 19a and 19b which are aligned with respect to the channels 8 and 9 in the valve body 2. The closing member 18 can be moved by an actuator unit 26 mounted at the upper part 27 of the support 16 and adapted to rotate the axle 23 in such a way that the ball body 22 can assume two positions:

A first position in which the horizontal channel 20 in the ball body 22 is aligned with the channels 19a and 19b in the support 16 and the fluid can flow from the upstream pipeline to the downstream pipeline through the fluid passage 15, and a second position obtained by rotating the axle 23 through 90° under the influence of the actuator unit 26, in which the wall of the ball body 22 blocks the channels 19a and 19b in the support 16 and thereby passage of fluid between the upstream pipeline and the downstream pipeline. The channels 19a and 19b define a fluid channel 21 in the closing member 3.

The axis 10 is also the axis of the fluid channel 21, and this axis intersects the geometric axis 11 of the inner cavity 6 at a point $O_1$ which is the center of the spherical cavity 24 and of the ball body 22. The axis of the rotation axle 23 is the geometric axis 11 which is likewise the geometric axis of the closing means 4 and the support 16.

In order to facilitate the introduction of the closing means 4 into the valve body 2 and to ensure alignment of the channels 19a and 19b in the support 16 with respect to the channels 8a and 8b in the valve body 2, the valve body comprises supplementary exteior wall elements 28 having vertical holes 29, and the support 16 comprises wall elements 30 corresponding to the supplementary wall elements 28 and provided with vertical guide pins 31 adapted to the holes 29.

During operation, the closing means 3 is joined to the valve body 2 by means of a connector device 4 comprising fixed elements and movable elements.

For this purpose, a circular part 35 of the wall 13 in the valve body 2, located adjacent the opening 7 to the valve body, is provided with rests or recesses 36 being open to the interior of the cavity 6 of the valve body 2.

Locking pieces 37 are mounted on support 16 and are movable radially in relation to the geometric axis 11 and being able to assume to extreme positions:

A first position in which each locking piece 37 is remote from the rests 36 and retracted into a chamber 38 in the support 16 so that insertion of the closing means 3 into the inner cavity 6 is permitted, or alternatively removal of the closing means 3 from this cavity 6, and another position in which projections 39 on each locking piece 37 are moved away from the geometric axis 11 and enter into a rest 36 so that the closing means 3 is connected to the valve body 2. The chambers 38 are formed in the exterior side wall of the support 16 and are open to the outside thereof and are located adjacent the rests 36 when the closing means 3 have been correctly installed in the valve body 2.

As shown in the drawings, the rests 36 consist of three circular grooves 36a the axis of which is the geometric axis 11 of the cavity 6 and the locking pieces 37 can all be retracted into the same chamber 38, which consists of a circular recess 40 the axis of which is the geometric axis 11 of the cavity 6 and with a horizontal upper wall 41 and lower wall 42.

The circular recess 40 comminicates with the upper surface 43 of the support 16 through vertical bores, in each of which there can slide a rod 44 which is extended above the upper surface 43. Each bore 44 is extended below the lower surface 42 of the circular recess 40 in the form of a bottom bore 46. The upper ends 47 of the rods 45 are attached to a ring 48 which is vertically movable. At the lower end 49 of each rod 45 there is mounted a cam element which is vertically movable together with the rod 45.

The side 51 of the cam element which faces away from the geometric axis 11 is designed with a crosssectional profile 52 of T shape, which can slide in a T groove 53 formed in a surface 54 at one of the locking pieces 37 facing towards the geometric axis 11. The surface 54 of the locking piece 37 is inclined downwards and against the geometric axis 11 and has a general direction which forms an angle of approximately 6° with the geometric axis 11. The T groove 53 is parallel to the surface 54 and extends from below and upwards along the whole thickness of the locking piece 37. The locking pieces 37 consist of segments 55 of an annular ring 56 the outer surface 57 of which is exactly matched to the shape of the circular part 35 of the wall 13 in the valve body 2, and the projections 35 on the locking pieces are in the form of teeth 58 the upper surface 59 of each of which is inclined upwards and against the inner cavity 6, thereby forming an angle of between 0° and 30° with the horizontal, whereas the lower surface 60 is inclined downwards and inwards towards the cavity 6 and also forms an angle of between 0° and 30° with the horizontal. This choice of angles of the upper surface 59 and the lower surface 60 in relation to the horizontal, makes it possible to avoid adhesion or wedging of the teeth 58 of the circular grooves 36a.

The outer diameter of the ring 56 is equal to the diameter of the circular grooves 36a. In the exampel shown in the drawings the number of segments 55 being formed from a ring 56, is equal to 10, but this number apparently can be higher or lower than 10. The dimension of each segment 56 in the circumferential direction is calculated in such a manner that the locking pieces 37 can be displaced radially without interfering with each other.

Because the T groove 53 forms an angle of approximately 6° with the vertical, it will easily be seen that when the cam element 50 is moved vertically, the profile 52 slides in the groove 53 and brings about a radial displacement of the locking pieces 37.

The ring 48 is adapted to be moved vertically be means of an actuating device not shown, for example a hydraulic cylinder, between two extreme positions:

An upper position (FIG. 11) in which the ring 48 is removed from the upper surface 43 of the support 16, which involves a positioning of the locking pieces 37 in the circular recesses 40, whereby the teeth 58 are located in the chamber delimited by the upper wall 41 and the lower wall 42 in the recess 40, and a lower position (FIG. 10) in which the ring 48 is located adjacent the upper surface 43 of the support 16, which brings the projections 39 on the locking pieces 37 to leave the circular recess 40 and enter into the grooves 36a.

The upper end 62 of the wall 13 in the inner cavity 6 has a widened shape, and the support 16 has a wall portion 63 matching the shape 62 of the upper wall and carries a seal 64 so that there will be a complete sealing of the cavity 6 when the closing means 3 is mounted in the cavity 6. A seal 65 is provided between the wall 13 and the valve body 2 and the wall 17 of the support 16. This seal or gasket is mounted in a circular groove 66 formed in the wall 17 between the connector device 4 and the lateral openings 67a, 67b for channels 19a and 19b. A seal 68 is also located between the vertical bores 44 and the rods 45.

The connector device 4 is protected against the environment by means of the seal 64 and the seals 68 and is moreover protected against the fluid flowing in the passage 21 by means of the seal 65.

The anchoring arrangement has a function to be described as follows:

Before the closing means is inserted into the valve body 2 through the opening 7, the ring 48 is placed in its upper position under the influence of the actuating device which can be a hydraulic cylinder, for example. The closing means 3 can then be introduced into the cavity 6. Then the hydraulic cylinder is actuated so as to move the ring 48 to its lower position, which results in the rods 45 and the cam elements 50 being moved downwards, the lower portion 61 of the cam elements entering into the bottom bores 46 and the locking pieces 37 partly protruding out of the support 16, and the teeth 58 will then come into contact with the wall in the circular grooves 36a.

In order to retract the closing means 3 from the valve body 2, the operation is effected in the inverse manner. It is sufficient to put the ring 48 in its upper position in order to release the closing means 3 from the valve body 2.

Locking or disconnection of the closing means is effected by a simple translatory movement of the ring 48. This elementary movement can be provided for by a robot.

We claim:

1. A valve for controlling the flow of a fluid, comprising:
   (A) a valve body having a fluid channel and an inner cavity formed therein, said inner cavity having a geometrical axis which is substantially normal to the longitudinal axis of said fluid channel, said valve body further having an opening formed therein which lies in a plane which is substantially normal to said geometrical axis;
   (B) a closing device having a movable closing member and a support which receives said closing member and which delimits a channel which is aligned with said fluid channel, said closing device being received in said inner cavity upon insertion of said closing device through said opening; and
   (C) a connector device for connecting said support to said valve body, said connector device being sealed from the ambient environment and from said fluid, said connector device including a fixed element comprising at least one rest formed in said valve body and being open to said inner cavity, and a movable element including a locking piece which is mounted in said support and which is radially movable within said support with respect to said geometrical axis, and an actuating member which is movable with respect to said valve body and which moves said movable element radially with respect to said geometrical axis from a first, locking position remote from said geometrical axis in which said locking piece is at least partially positioned in said rest to lock said closing device within said valve body, to a second position which is closer to said geometrical axis than said first position and in which said locking piece is located in the support to enable insertion and removal of said closing device into and out of said inner cavity.

2. A valve according to claim 1, wherein said actuating member is movable substantially parallel to said geometrical axis.

3. A valve according to claim 2, wherein each rest comprises a circular groove which is coaxial with said inner cavity.

4. A valve according to claim 3, wherein a plurality of said locking pieces are provided and are formed by segments of a ring having an outer surface matching the shape of said circular groove.

5. A valve according to claim 4, wherein a circular chamber is formed in said support, receives said segments, and opens towards said circular groove, and further comprising a plurality of cam elements, each of which cooperates with a respective one of said segments and which is axially movable with said actuating member such that axial movement of the cam element produces radial displacement of the respective segment.

6. A valve according to claim 5, wherein a surface of each of said segments is located adjacent said geometrical axis and is inclined with respect to said geometrical axis, wherein each of said cam elements slides along said surface of the respective one of said segments to form a pair of mating elements, and wherein, in each pair of mating elements, a T-groove is formed in one of the cam element and the respective segment of each pair of mating elements and is received in a T-member formed in the other of the cam element and the respective segment.

7. A valve according to claim 6, wherein a plurality of bores are formed in said support and extend in parallel to said geometrical axis, and further comprising:

a ring which is located outside of said valve and which is movable substantially parallel to said geometrical axis upon actuation of said actuator, and a plurality of rods, each of which is displaceable in a respective one of said bores and has a first end which is connected to said ring and a second end which is connected to a respective one of said cams such that movement of said ring parallel to said geometrical axis results in simultaneous radial movement of all of said segments.

8. A valve according to claim 1, further comprising seal elements which are provided between said support and said valve body at either side of said connector device.

9. A valve according to claim 8, wherein said seal elements are carried by said support.

* * * * *